United States Patent [19]
Reynolds

[11] 3,966,088
[45] June 29, 1976

[54] LEAK DETECTION APPARATUS

[75] Inventor: David E. Reynolds, Littleton, Colo.

[73] Assignee: Continental Oil Company, Ponca City, Okla.

[22] Filed: Apr. 14, 1975

[21] Appl. No.: 567,669

Related U.S. Application Data

[63] Continuation-in-part of Ser. No. 459,151, April 8, 1974, Pat. No. 3,935,567.

[52] U.S. Cl.................................. 222/63; 73/40.5 R; 318/480; 340/242
[51] Int. Cl.²..................... G01M 3/00; B67D 5/08
[58] Field of Search ............... 222/52, 63; 340/242; 73/40.5; 318/480; 307/311; 417/9

[56] References Cited
UNITED STATES PATENTS

| | | |
|---|---|---|
| 2,952,390 | 9/1960 | Fowler et al........................ 222/63 |
| 3,273,753 | 9/1966 | Johnson et al....................... 222/52 |
| 3,577,049 | 5/1971 | Madurski et al................. 318/480 X |

OTHER PUBLICATIONS
B380,310, Jan. 28, 1975, Padgitt, 318/480.

*Primary Examiner*—Robert B. Reeves
*Assistant Examiner*—Joseph J. Rolla
*Attorney, Agent, or Firm*—William J. Miller

[57] ABSTRACT

A leak detection apparatus for a dispensing apparatus having a pump and a pressure-sensing apparatus with an output switch responsive to a predetermined pressure has a pump interrupter circuit with a control input. A pump interrupter control circuit has an input and an output connected to the control input of the pump interrupter circuit. A timing circuit has an output, and an input for initiating a signal at the output for a predetermined period of time. The timing circuit is connected through the pressure-sensing apparatus output to the input of the pump interrupter control circuit such that a leak in the dispensing apparatus will cause closure of the output switch, transferring the signal at the output of the timing circuit during the predetermined period of time to the input of the pump interrupter control circuit causing the pump interrupter circuit to interrupt the operation of the pump.

8 Claims, 2 Drawing Figures

FIGURE 2

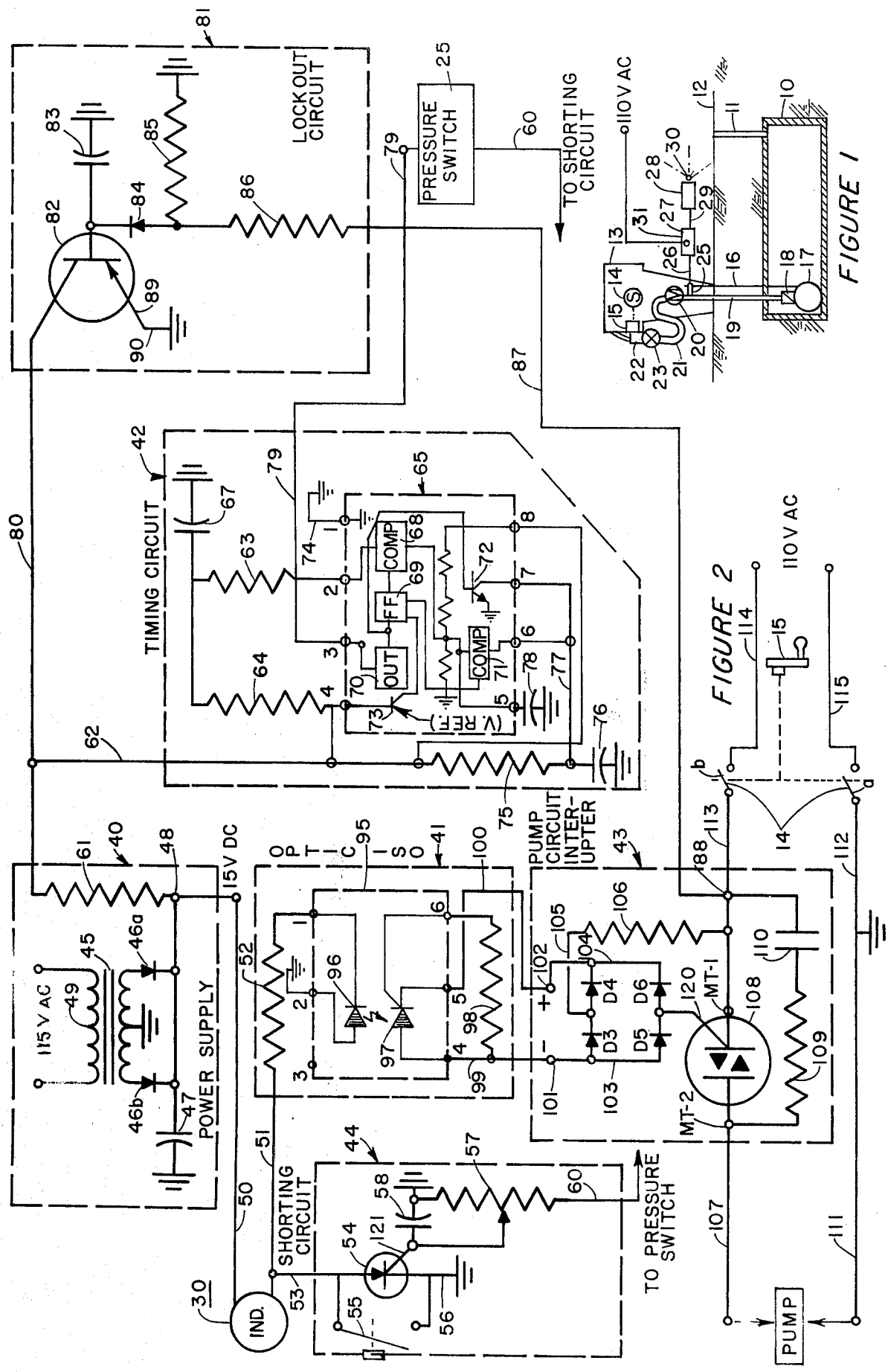

LEAK DETECTION APPARATUS

RELATED APPLICATIONS

This application is a continuation-in-part of application Ser. No. 459,151, filed Apr. 8, 1974, by David E. Reynolds and entitled "Leak Detection Apparatus," now U.S. Pat. No. 3,935,567.

A divisional application, Ser. No. 537,985, filed Jan. 2, 1975, by David E. Reynolds, and entitled "Leak Detection Apparatus" is related to this application. In the parent application, a device is described and essentially comprises three essential elements—a pressure-sensitive switch, a timing circuit which measures the bleed down in pressure of the line between the pump and dispensing nozzle, and an indicator means responsive to either a leak or no-leak condition. If a predetermined drop in pressure is measured by the pressure-sensitive switch, a circuit is operated which turns on an indicator light, thereby visually indicating a defective or leaky system. If no leak is detected, a non-leak indicator light is turned on denoting that the system is satisfactory.

BRIEF DESCRIPTION OF THE INVENTION

This invention differs from the above-described invention by including a lockout circuit operated by the pressure-sensitive switch in cooperation with a timing circuit such that if the pressure drop exceeds a predetermined amount, the lockout device through associated circuitry disconnects the pump which supplies gasoline to the gasoline dispensing apparatus. Upon disconnecting the pump circuit, an indicator light is turned on indicating a leak is present. The circuit additionally includes a reset switch to recycle the system so that if some malfunction in either the equipment or a temporary malfunction in the dispensing equipment is present, the circuit will, when reset, permit continued operation of the dispensing apparatus.

BRIEF DESCRIPTION OF THE FIGURES

FIG. 1 is a cross-sectional view of a dispensing pump and tank installation; and FIG. 2 is an electronic circuit diagram used in the apparatus illustrated in FIG. 1.

DETAILED DESCRIPTION OF THE FIGURES

Referring to FIG. 1, a representation of a gasoline dispensing system is illustrated having a tank 10 and a fill tube 11 connected between the surface of the ground in tank 10. A gasoline dispensing apparatus 13 has an electrical switch 14 which is mechanically coupled to a hand-operated lever 15. Under normal conditions the hand-operated lever 15, when rotated, closes electrical switch 14 and the closure is communicated through electrical line 16 to a pump 17 located in the bottom of tank 10. Pump 17 is coupled through a check valve 18 and pipe 19 to a metering system 20 and then through a flexible pipe 21 to a hand-held dispenser 22 which contains a hand-operated closure valve 23. In order to measure a leak, a pressure-sensitive switch 25 is connected electrically through wire 26 to an electrical control circuit 27, which in turn is coupled to an indicator box 28 through wires 29. Indicator box 28 has a visual indicator 30 which will denote a leak condition. Switch 31 is also electrically coupled or mounted to control box 27 to reset the apparatus after a leak condition has been detected.

The operation of the system above-described is as follows.

Tank 10 is filled with gasoline or other petroleum products through a fill tube 11. In order to remove the product from tank 10, a dispenser 22 is removed from its holder and hand-operated lever 15 mechanically rotated to close switch 14. Closure of switch 14 applies power, usually 110 volts, down line 16 to pump 17 which begins to draw product from tank 10 through check valve 18 and into pipe 19, building the pressure to approximately 20 pounds. When dispenser 22 is inserted into a receptacle to receive the product from tank 10, hand-operated valve 23 is opened, permitting material to flow from pipe 19 through meter 20, flexible pipe 21, out dispenser 22, and into the receptacle. Once the container is filled, valve 23 is closed, causing pressure to again assume its normal 20 pounds in pipe 19. Before dispenser 22 can be rehung, hand-operated lever 15 must be rotated turning off switch 14 which disconnects pump 17, shutting it off. When switch 14 is opened, the electronic circuitry in box 27 is activated putting into operation a timing circuit which monitors the drop in pressure detected by switch 25 over a predetermined period of time. If the drop in pressure is within the permissible amount, the electronic circuitry is deactivated until the pump is again operated. If the drop in pressure exceeds the amount permissible, the pump 17 is deactivated and an indicator light 30 turns on indicating that a leak is present in the dispensing line 19. Reset button 31 can be operated to reset the electronic circuitry permitting reoperation of the dispensing apparatus. However, continued excessive pressure loss will indicate that the line must be repaired or the cause of the leak determined. The particular electronic circuitry utilized to accomplish the above is set out in FIG. 2. The circuit essentially consists of a power supply 40, an optic isolation circuit 41, a timing circuit 42, a pump circuit interrupter 43, and a shorting circuit 44. Power supply circuit 40 is a standard circuit well known in the art and essentially comprises a transformer 45, diode rectifiers 46A and 46B, which are connected to a filter capacitor 47 and to an output terminal 48 supplying 15 volts DC. The input winding 49 is connected to any source of power such as a 115 volts AC. The output terminal or voltage at pin 48 is supplied to indicator 30 through a wire 50 and then through a wire 51, through resistor 52, to terminal 1 of optic isolation circuit 41. Indicator 30 is also connected through a wire 53 to an SCR 54 and switch 55. The switch 55 and SCR 54 are likewise connected to a ground 56. Shorting circuit 44 also includes a variable resistor 57 and capacitor 58. One side of capacitor 58 and resistor 57 is connected to ground. The other side of capacitor 58 and the movable arm of adjustable resistor 57 are connected to SCR 54. The other side of resistor 57 is connected through a wire 60 to pressure switch 25. Terminal 48 of power supply 40 is also connected through a dropping resistor 61, through a wire 62 to pin 4 and pin 8 of timing circuit 42. Resistors 64 and 63 are connected from pins 4 and 2, respectively, of an integrated circuit 65, through capacitor 67 to ground. Integrated circuit 65 is a circuit manufactured by Signetics Company, Sunnyvale, California, under the part name NE555V and basically includes a comparator circuit 68 connected to a flip-flop circuit 69 to an output circuit 70. The comparator circuit 68 is connected to another comparator circuit 71 and the output of the flip-flop is connected to a transistor 72 to pin 7.

Pin 4 is connected through a transistor 73 to a second input of the flip-flop circuit. Dropping resistors are used to provide proper voltages for the operation of the circuit. A detailed description of the electrical circuit is well known in the art and will not be further described. Pin 1 of integrated circuit 65 is connected to wire 74 to ground. A resistor 75 is connected from wire 62 through a capacitor 76 to ground. The junction between resistor 75 and capacitor 76 is connected to a wire 77 to pins 6 and 7 of integrated circuit 65. Pin 5 is connected through a capacitor 78 to ground. Pin 3 of integrated circuit 65 is connected through a wire 79 to pressure switch 25.

Resistor 61 from power supply 40 is connected through a wire 80 to a lockout circuit 81 which comprises a transistor 82, which has its base connected through a capacitor 83 to ground, and to a diode 84 through a resistor 85 to ground, and to a second resistor 86 through a wire 87 to terminal 88 of pump circuit interrupter 43. An emitter 89 is connected through a wire 90 to ground. Transistor 82 is type 2N2222.

Referring to optic isolation circuit 41, an integrated circuit 95 comprises an LED diode 96 connected between pins 1 and 2 and a photo SCR 97 connected between pins 4 and 5 with its trigger connected to pin 6. Such an optic isolator is manufactured by General Electric Company under part No. H11C1 and is well-known in the art. A biasing resistor 98 is connected between pins 4 and 6 of integrated circuit 95. The input to photo SCR 97 through pins 4 and 5 is connected through wires 99 and 100 to terminals 101 and 102, respectively, of pump circuit interrupter 43.

Referring to pump circuit interrupter 43, a bridge circuit consisting of diodes D3, D4, D5, and D6 is appropriately connected having the anodes of diodes D3 and D5 connected through a wire 103 to terminal 101. The cathodes of diodes D4 and D6 are connected through a wire 104 to terminal 102. The junction between D3 and D4 is connected through a wire 105 and resistor 106 to terminal 88 which is also connected to the input MT1 of a Triac 108 which is type 2N6151. Terminal MT2 is connected through a wire 107 to pump 17. A resistor 109 is connected through a capacitor 110 to terminal 88. The remaining side of pump 17 is connected through a wire 111 to ground. Switch 14 comprises a double-pole single-throw switch labeled A and B, respectively. Switch A is coupled through a wire 112 to ground, and switch B is coupled through a wire 113 to terminal 88. The remaining side of switch B is coupled through a wire 114 to a source of voltage such as 110 volts AC and the remaining side of switch A is coupled through a wire 115 to said source of power.

OPERATION

The circuit shown in FIG. 2, under normal conditions, is in the off mode. When the pump is operated, lever 15 is rotated, activating the pump motor 17, and by closing switch 14, power is then supplied through wires 114 and 115 to 113 and 112, respectively, through 111 to one side of pump 17 and through Triac 108, through wire 107 to the remaining side of pump 17. At the same time, power is supplied from terminal 88 through wire 87 and resistor 86 to diode 84 which applies power to the base of transistor 82, causing transistor 82 to saturate. When transistor 82 saturates, wire 80 will be effectively grounded through wire 90. Thus, the voltage on wire 62 drops to near zero volts and all of the voltage of power supply 40 will appear between terminal 48 and ground across resistor 61. Thus, the voltage at pin 4 of integrated circuit 65 will drop to zero. Resistors 64 and 63 along with capacitor 67 function as a time constant. The voltage at pin 2 will, once capacitor 67 discharges, drop to zero, along with pin 4. The voltage at pin 8 will also drop to zero when the voltage at pin 4 drops to zero. The voltage on pins 6 and 7 will drop to zero once capacitor 76 has discharged. Resistor 75 and capacitor 76 function as a time delay circuit, capacitor 76 maintaining an output high at terminal 3 for about 30 seconds. During this period of time, pressure switch 25 is in an open condition, that is, with sufficient pressure at the pump that pressure switch 25 will be open; therefore, there is no connection between pin 3 of integrated circuit 65 through wire 79, wire 60, to the shorting circuit 44. Indicator 30 is intended to light only when there is a leak in line 19 or its associated connections. In order to accomplish this, the current through lines 50 or 51 must be maintained low in a no-leak connection and high during a leak in the pipes or associated couplings. When switch 14 is closed during the dispensing of gasoline, power is applied between wires 112 and 113. Power is subsequently applied then to the bridge circuit comprising diodes D3, D4, D5, and D6. Under normal dispensing conditions, then, the power as applied to the diode bridge will pass through wires 100, through photo SCR 95, through pin 4, through the bridge circuit comprising diodes D3, D4, D5, and D6, to an input trigger 120 of Triac 108. The voltage being applied at trigger 120 will be proper to permit operation of Triac 108 thereby permitting the Triac to have a low impedance to the flow of current regardless of the polarity of the AC being applied across MT1 and MT2. In view of the above, pump 17 will operate continuously. Furthermore, with pressure switch 25 open, line 60 will be open providing no voltage to the trigger 121 of SCR 54 of shorting circuit 44. With SCR 54 in an open condition or high impedance condition, current will flow from junction 48 of power supply 40 through indicator light 30, through wire 51 and resistor 52, to input terminal 1, through LED diode 96, through pin 2 to ground. With the current flowing in this manner, the LED diode will be ignited, triggering photo SCR 97, maintaining the photo SCR in a low impedance state.

When the dispensing is completed, switch 14 is opened, disconnecting the power to lines 113 and 112. The voltage at junction 88 will then drop to zero causing the voltage through wire 87 to drop to zero and consequently causing transistor 82 of lockout circuit 81 to go into a nonconductive state. With transistor 82 nonconductive, the voltage will begin to rise on wire 62. The increase in voltage is determined by the time constants of resistors 64, 63, and capacitor 67. With capacitor 67 charging, the voltage on pin 4 will increase faster than the voltage on pin 2. In addition, the voltage on pin 8 will increase at the same rate as the voltage on pin 4, while the voltage on pins 7 and 6 will increase at a rate determined by the time constant of resistor 75 and capacitor 76. The time constant of this resistor-capacitor combination will maintain the output high on terminal 3 for about 30 seconds at which time the voltage on terminal 3 will drop. If, during this 30-second interval, a leak should be present in line 19 or its associated connections, and the leak is sufficient to operate pressure switch 25, thereby closing same, then the voltage present on pin 3 during this 30-second interval will be communicated through wire 79, through the closed pressure switch 25, through wire 60 to adjustable resistor 57. Voltage on resistor 57 will be applied to the trigger circuit 121 of SCR 54 of shorting circuit 44. Voltage on trigger circuit 121 will cause SCR 54 to go conductive thereby applying nearly a short circuit between wire 53 and wire 56. This will provide sufficient current to light indicator light 30 indicating that a leak is present. It will also drop the voltage on LED 96 of optical isolation circuit 95 to the point where it will no longer ignite. When LED 96 goes out, no light will be supplied to circuit 97 as a trigger. Thus, if the pump is reactivated by closing switch 14, photo SCR 97 will not trigger and therefore, the impedance between pins 4 and 5 will be high causing no trigger voltage to appear on trigger 120 of Triac 108. With the trigger voltage not present, Triac 108 will not conduct thereby rendering pump 17 inoperative. On many occasions, a leak will occur because of some slight malfunction in a valve in the dispensing apparatus or in the check valve 18, for example, dust or dirt. Under these conditions, the system can be reset by pressing switch 55. With the closure of switch 55, it will momentarily drop the voltage across the SCR 54 to zero rendering it nonconductive. Thus, the sequence can be repeated and pump 17 reactivated. If a leak is still present, the system can be continually operated as long as switch 55 is continually depressed for each operation of switch 14. However, it is obvious if continuous operation is necessary, that a leak is present in line 19 and should be repaired.

Returning to the timing circuit, once switch 14 has been opened and the sequence initiated, causing voltage to again be applied to pin 4 and pin 8, the voltage as pin 3 will be high only so long as capacitor 76 has not charged sufficiently to cause pins 6 and 7 to reach their original voltage. This interval is usually 30 seconds. After the 30-second interval, the voltage on pin 3 will drop, causing a loss of voltage on line 79 to pressure switch 25. Even if pressure switch 25 should close after the 30-second interval, there will be insufficient voltage on line 79 to trigger through line 60 the trigger 121 of SCR 54 in shorting circuit 44. Thus, timing circuit 42 permits the timing of a 30-second interval to detect a leak in pipe 19. If no leak is detected during this period of time, the system will be returned to its original state and pump 17 will not be rendered inoperative. The circuit is especially useful when the pumps are shut down for the evening since over a long interval of time pressure could very well drop in line 19 even in a tight system.

CONCLUSIONS

A leak detection system has been disclosed which permits operation of a pump dispensing apparatus in a filling station in a normal manner. After the pump has been closed down, the circuit will measure the leakage in the pump dispensing apparatus and associated pipes for an interval of a predetermined time, such as 30 seconds. If a leak is developed during this 30-second interval, the pump is rendered inoperative requiring the operator to either personally activate the system again or maintain it in a shutdown condition until the system can be repaired. An indicator light is provided to visually show that a leak has been detected in the pump dispensing apparatus and its interconnecting pipes. It is obvious that other changes and modifications can be made in the circuit disclosed and still be within the spirit and scope of the invention as described in the specifications and appended claims.

What I claim is:

1. A leak detection apparatus for a dispensing apparatus having a pump and a pressure-sensing apparatus with an output switch means responsive to a predetermined pressure comprising:
    a. a pump interrupter circuit means having a control input wherein said pump interrupter control circuit comprises an optical isolation circuit having a LED diode signal input and a photo-SCR controlled output; a shorting circuit means connected across said LED diode signal input, said shorting circuit means having a control input connected to said output switch means; and means for connecting said photo-SCR controlled output across said pump interrupter circuit means control input.
    b. a pump interrupter control circuit means having an input and an output connected to the control input of said pump interrupter circuit means wherein said pump interrupter control circuit comprises an optical isolation circuit having a LED diode signal input and a photo-SCR controlled output; a shorting circuit means connected across said LED diode signal input, said shorting circuit means having a control input connected to said output switch means; and means for connecting said photo-SCR controlled output across said pump interrupter circuit means control input;
    c. a timing circuit means having an output and input means for initiating a signal at said output for a predetermined period of time; and
    d. means for connecting said timing circuit means through said pressure-sensing apparatus output to the input of said pump interrupter control circuit means, whereby a leak in said dispensing apparatus will cause closure of said output switch means, transferring said signal at the output of said timing circuit means during said predetermined period of time to the input of said pump interrupter control circuit means, thereby causing said pump interrupter circuit means to interrupt the operation of said pump.

2. A leak defection apparatus as defined in claim 1 wherein said timing circuit input means includes a lockout circuit means having an input power means and an output means; dispensing apparatus voltage interruptive means; means for connecting the input power means to said voltage interrupter means; and means for connecting said lockout circuit output means to said timing circuit means for initiating a signal.

3. An apparatus as described in claim 1 including an indicator light connected to said shorting circuit means and to indicate the presence of a leak in said dispensing apparatus.

4. A leak detection apparatus as defined in claim 1 wherein said timing circuit input means includes a lockout circuit means having an input power means and an output means; dispensing apparatus voltage interruptive means; means for connecting the input power means to said voltage interrupter means; and means for connecting said lockout circuit output means to said timing circuit means for initiating a signal.

5. An apparatus as described in claim 1 including a reset means for resetting said shorting circuit means.

6. A leak detection apparatus for a dispensing apparatus having a pump and a pressure-sensing apparatus with an output switch means responsive to a predetermined pressure comprising:
a. a pump interrupter circuit means having a control input
b. a pump control circuit means including an input means and an output means connected to said control input and wherein said pump control circuit means comprises an optic isolator having its LED diode connected across said input means and its photo-SCR connected across said control output;
c. shorting circuit means having an output connected across the input means of said pump control circuit means and a trigger input;
d. a timing circuit means having an input means and an output means whereby a signal at said input means will develop a signal at said output means for a predetermined period of time;
e. means for connecting said timing circuit means output means through said pressure-sensing apparatus output switch means to the trigger input of said shorting circuit;
f. lockout circuit means having an output and a control input means; and
g. power means selectively connected through said pump interrupter circuit means to said pump and to the control input means of said lockout circuit means.

7. An apparatus as defined in claim 26 wherein said shorting circuit means includes a SCR connected across the input means of said pump control circuit means and the trigger of said SCR connected to the output switch means.

8. An apparatus as defined in claim 7 including a normally open switch across said SCR whereby said SCR can be reset.

* * * * *